MECHANICAL DEVICE

Filed Sept. 24, 1959 3 Sheets-Sheet 1

INVENTORS
KENNETH W. SAVAGE
LEONARD H. SAVAGE
BY
Woodhams, Blanchard and Flynn
ATTORNEYS Sept. 27, 1960 K. W. SAVAGE ET AL 2,953,947

MECHANICAL DEVICE

Filed Sept. 24, 1959 3 Sheets-Sheet 2

INVENTORS
KENNETH W. SAVAGE
LEONARD H. SAVAGE
BY
Woodhams, Blanchard and Flynn
ATTORNEYS Sept. 27, 1960 K. W. SAVAGE ET AL 2,953,947

MECHANICAL DEVICE

Filed Sept. 24, 1959 3 Sheets-Sheet 3

INVENTORS
KENNETH W. SAVAGE
LEONARD H. SAVAGE
BY
Woodhams, Blanchard and Flynn
ATTORNEYS United States Patent Office 2,953,947

Patented Sept. 27, 1960

2,953,947

MECHANICAL DEVICE

Kenneth W. Savage, Grandville, and Leonard H. Savage, Grand Rapids, Mich., assignors to The Lithibar Company, Holland, Mich., a corporation of Michigan Filed Sept. 24, 1959, Ser. No. 842,038

7 Claims. (Cl. 74—815)

This invention relates to an indexing device for successivly positioning objects in a repeatable pattern at readily selected positions with respect to each other.

In the following discussion it will be borne in mind that the need out of which this invention arose occurred in the field of rotatable work tables for presenting various portions of a workpiece to a machine tool, as a drill, for having work done at preselected portions thereon. Thus, the specific embodiment of the invention chosen for illustrative purposes is a rotatable, indexable table adapted for so presenting a workpiece. However, it will be understood that this embodiment is selected for illustrative purposes only and that many other adaptations, including straight-line operation of the indexable table, may be made and will be within the scope of the invention.

The basic needs out of which this invention arose are fully set forth in our application Serial No. 727,820, filed April 11, 1958 to which reference is invited and hence need not be repeated here. It is sufficient to say here for a clear understanding of the present invention that there are many uses in a variety of fields, well exemplified by the machine tool industry but by no means limited thereto, wherein it is desired to control a rotatable, indexing table to cause it to stop at a variety of preselectable points as desired. In many instances these points are irregularly spaced about the path of rotation of the table and, further, said stopping points may vary from one job to another. Hence, the conventional control over same by cams or templates is not sufficiently flexible to be entirely satisfactory.

Further, as parts wear during operation even a precise adjustment will eventually fail. Therefore, it is desirable not only to have means for modifying an adjustment or selection of the stopping points from one job to another, but it is also desirable to have means for correcting such adjustment as needed from time to time during a given job.

While the machine set forth in our above-mentioned application has in general been highly satisfactory, in a constant effort to improve upon the apparatus therein set forth certain problems and limitations have been observed which have been solved by the present invention. Particularly, it was desired to improve over the previous design by having as many as possible of the working parts enclosed within a suitable framework in order to obtain a better appearance, to obtain a higher degree of safety and to minimize malfunctioning which occasionally otherwise resulted from the entry of dirt or metal particles into the working parts of the table indexing mechanism. Further, it was desirable to render the adjusting devices more accessible and particularly to render them accessible from any point around the periphery of the apparatus whereby to enable the operator to effect both an original adjustment as well as subsequent modifications thereof with a maximum of ease. In this latter connection it was particularly noticed that the mechanism cooperating with the screw heads for limiting movement along the rotation-limiting cam were necessarily radially outwardly of a given screw head at the moment of being in operative relationship thereto. This made it impossible to adjust that particular screw. However, it was often desired to adjust the screw at the time the table was in the indexing position corresponding to said screw. In this arrangement it accordingly became necessary to hold the table out of a position with which the adjustment was desired, adjust the screw slightly, then move the table back into the position to see whether the adjustment was correct. Therefore, it was particularly desirable to render all of the screws, including the screw representing the position in which the indexing table occupied at the particular moment, accessible at any time for adjustment.

Accordingly, the objects of the invention are:

(1) To provide an indexing device capable of indexing adjustment through a repeated pattern but wherein the device is readily adjustable through a wide variety of preselectable indexing patterns.

(2) To provide an indexing device, as aforesaid, wherein the working parts are all substantially enclosed within suitable framework whereby to protect workmen from injury, to improve the appearance of the apparatus and to protect the working parts thereof from injury by the entry thereinto of dirt or foreign particles.

(3) To provide an indexing device, as aforesaid, wherein all of the adjustable elements are readily accessible in any position of the apparatus.

(4) To provide an indexing device, as aforesaid, whose principles can be applied to straight-line indexing as well as to rotary indexing.

(5) To provide an indexing device, as aforesaid, whose principles are applicable to indexing problems such as in container filling or closing, to the presentation of a variety of tools to reciprocably fed work (as in a turret lathe) or to the presentation of work in a variety of positions to a single tool.

(6) To provide a device, as aforesaid, which will be strong and sturdy and whose parts will not be subject to unreasonable wear and which can in the normal operation of the device be readily compensated for such wear as does occur.

(7) To provide a device, as aforesaid, which will not be unreasonably expensive to manufacture or to maintain in good operating condition.

Other objects and purposes of the invention will be apparent to persons acquainted with devices of this general type upon reading the following disclosure and inspection of the accompanying drawings.

Figures 1, 2, 3, 4, 5:
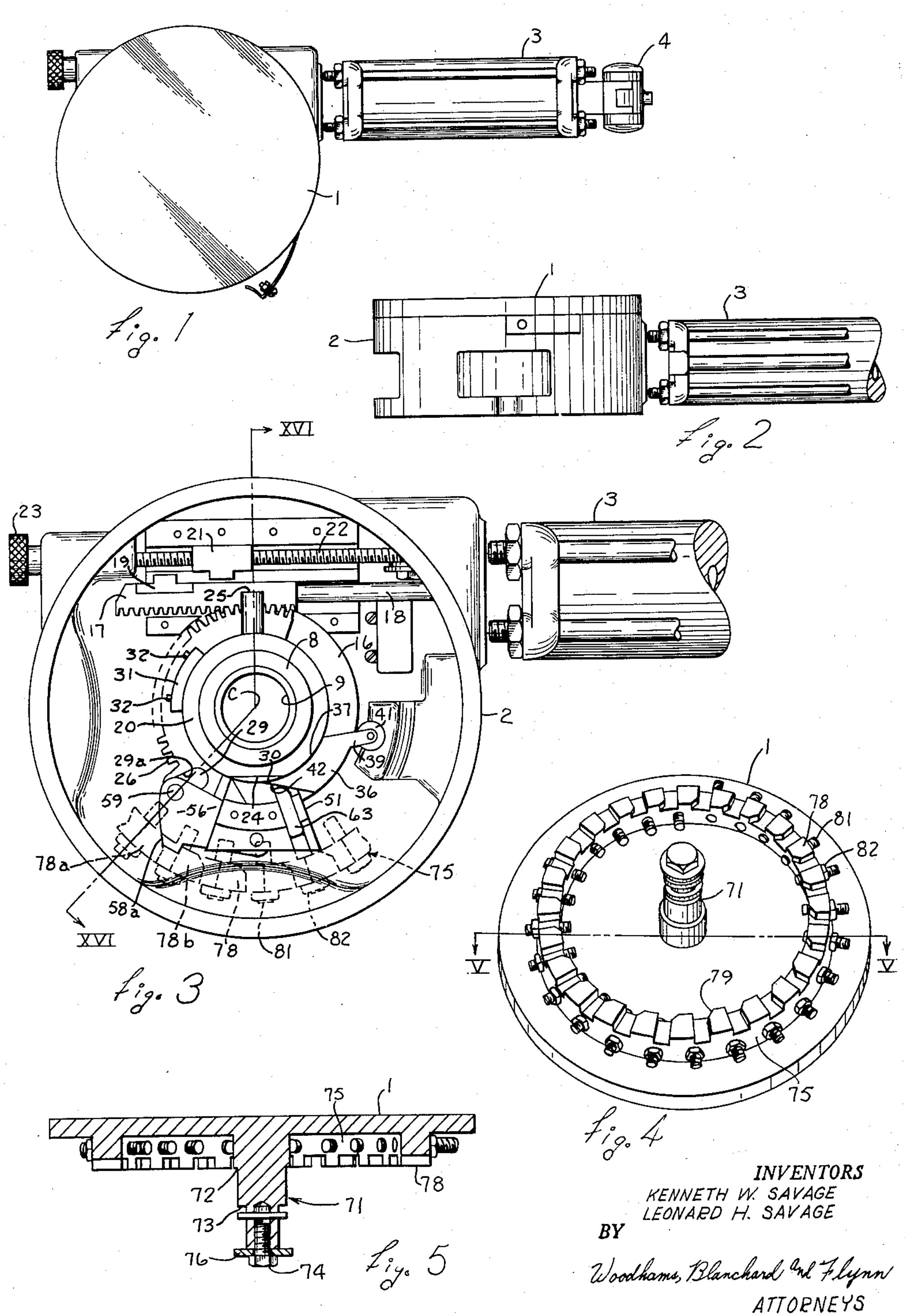
Figure 1 is a top view of an embodiment of the invention utilizing a rotatably indexable table.
Figure 2 is a fragmentary side view of the device shown in Figure 1.
Figure 3 is a top view of the device shown in Figure 2 with the table removed and showing a portion of the annulus and screws on the table in broken lines.
Figure 4 is an oblique view of the rotatable table from the under side thereof.
Figure 5 is a section taken on the line V—V of Figure 4.

In the following description certain terminology will be used for convenience of reference but it will be understood to be solely for purposes of convenience and as having no limiting significance. For example, the terms "inwardly" and "outwardly" and derivatives thereof and words of similar import will refer to directions toward and away from the geometric center of the apparatus or of the part thereof to which reference is made at a given time. The words "upwardly" and "downwardly" and derivatives thereof and words of similar import will refer to the apparatus in its position of normal use, namely, where the table is in a position for supporting objects thereon as in the position shown in Figure 2. The terms "rightward" and "leftward" and derivatives thereof and words of similar import will refer to rightward or leftward directions as appearing in the drawings.

*General description*

In general, the apparatus consists of indexing mechanism for moving, as rotating, the carrier in an indexing direction to the limit of its capacity for movement in a given instance together with the limiting of such movement by the combined action of a wedge arranged at an angle to the direction of indexing movement, a slider arranged to ride on said wedge in response to indexing movement and thereby itself move in a direction other than the direction of indexing movement and separably adjustable means capable of limiting the movement of said slider independently and as desired at and with respect to each of a plurality of stations.

More particularly, and with reference to this embodiment, the wedge device is mounted on the stationary base for the indexing table, the slider is carried on and by the pawl mechanism for movement therewith and simultaneously to limit the movement thereof. Said slider mechanism moves radially outwardly as it moves circumferentially in response to movement of said pawl and the distance through which it is permitted to move radially outwardly is determined by a plurality of radially aligned and radially adjustable screws.

*Detailed description*

Referring now to the drawings in detail there is shown an embodiment of the invention comprising a rotary indexing table 1 which is supported upon suitable base structure 2 and is operated by pressure fluid cylinder 3. Any suitable control structure 4 for the cylinder 3 may be provided as desired.

Referring first to the base structure 2, there is shown in this embodiment a casting having a bottom 6 and an upstanding, circular, peripheral flange 7. The upper surface of said circular flange 7 constitutes, as will be seen hereinafter, the primary support for the table 1. Centrally located within said casting is a hollow upstanding boss 8 having a radially inwardly extending shoulder 9 located intermediate the upper and lower ends thereof. This boss and shoulder constitute the centering support for the table 1. A further upstanding boss 11 is provided between the boss 8 and the rim of the base structure 2 and has a partially cylindrical opening 12 therein for holding the hereinafter-mentioned limit cam. Horizontal slide channels 13 and 14 are provided for receiving and guiding a driving rack and a control device for same. A smooth and circular surface 16 is provided surrounding the central boss 8 for slidably supporting the hereinafter-mentioned segmental gear and pawl carrying fixture. Said surface is substantially coplanar with and communicates with the rack-guiding slideway 13.

A rack 17 (Figure 3) is slidably positioned within the slideway 13 and is reciprocably operated by a rod 18 which is in turn operated as convenient, from and by the cylinder 3. Said rack carries a stop 19 thereon which is engageable with a further stop 21, said latter being adjustably carried on the screw 22. Rotation of the screw 22 by the knob 23 adjusts the position of a stop 21 axially therealong.

A ring 20 encircles the hollow boss 8 and is slidably supported on the circular surface 16. The ring 20 has cut-out portions defining vertically aligned flats 23 and 24 along the periphery thereof. An arcuate portion 30 is interposed between the flats 23 and 24 and constitutes an extension of the circular periphery of the remainder of said ring.

A resiliently-backed brake mechanism 25, described further hereinafter, is carried on and by said ring 20 to provide some drag between said ring and the hollow boss 8 whereby to prevent looseness or overrunning by the parts carried on said ring 20 with respect to the hollow boss 8. A segmental gear 26 is slidably supported on the circular surface 16 and bears snugly at its radially inward edge against the radially outward surface of the ring 20. Said segmental gear 26 has teeth 27 in engagement with the teeth of the rack 17 and carries an upstanding structure 28 at its one end which provides a pawl-controlling cam. In this embodiment, the pawl-controlling cam is defined by the slot 29 which is positioned angularly with respect to the tangent to said gear at the point where said slot 29 is located. A retainer 31 is fastened as convenient, as by screws 32, to the ring 20 for holding said segmental gear 26 snugly, but slidably against the surface 16.

Figure 16:
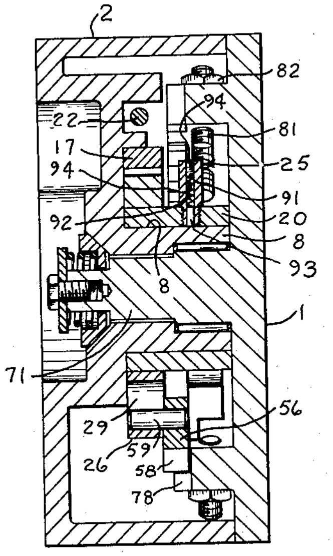
Figure 16 is a section taken on the line XVI—XVI of Figure 3, but showing the top in assembled and operative relationship with respect to the base structure.

The brake structure 25 (Figure 16) includes a housing 91 fastened in any convenient manner to the ring 20, as by being screwed thereinto. Said housing has an internal opening 92 therein receiving a slidable cylinder 93 acting as the brake portion thereof, a spring 94 urging said cylinder 93 resiliently against the radially outer surface of the hollow boss 8 and a threaded member 94 closing the internal opening 92 and acting as a tension adjustment for said spring.

The rotation limiting cam 36 has a concave surface 37 by which it lies against the outer surface of the ring 20 and is positioned to engage the arcuate portion 30 thereof. Thus, the cam 36 continuously engages a completely circular portion of ring 20 and does not engage the flats 23 and 24. It further has an arm 39 pivotally supporting at the end thereof a roller 41, said roller being received into the opening 12. Thus, regardless of wear between the ring 20 and the cam 36, said cam always lies snugly against the outer surface of said ring. Said cam is provided further with a cam surface 42 lying in general at an angle to the direction of movement of said table at the radial location of said cam surface 42.

Figure 6:
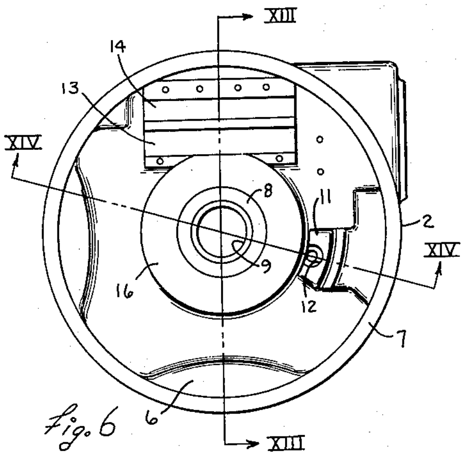
Figure 6 is a top view of the casting in which the working parts are assembled.
Figure 7:
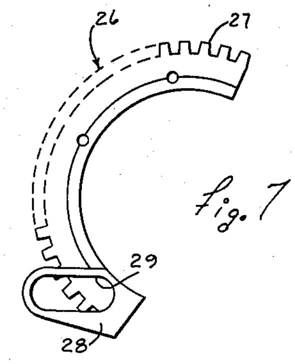
Figure 7 is a top view of the gear segment by which the indexing parts are driven.
Figure 8:
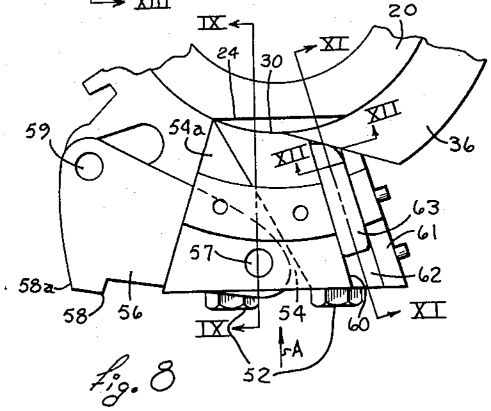
Figure 8 is an enlarged top view of a fragment of Figure 3 showing the pawl and cam mechanism.

A pawl guiding fixture 51 is secured by screws 52 to the ring 20 and is positioned against the flat 23 (Figures 3 and 6) on the ring 20. The fixture 51 has a slot 54 therein, which slot is partially exposed at 54*a* (Figure 8). A pawl 56 extends through the slot 54 and is pivotally mounted on the fixture 51 by the pin 57. The pawl has a tooth 58 thereon for engagement with suitable teeth depending from the table as hereinafter described and it further has a downwardly extending pin 59 which enters into and cooperates with the cam opening 29 (Figures 7 and 15), for movement of said pawl radially in response to movement of the gear segment 26.

Figure 9:
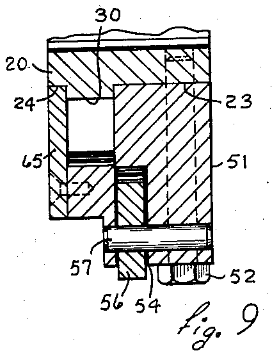
Figure 9 is a sectional view taken on the line IX—IX of Figure 8 modified to show a cover plate on the panel guiding fixture.
Figure 10:
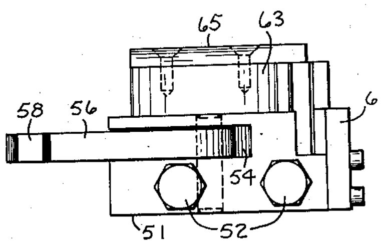
Figure 10 is an elevational view of the apparatus shown in Figure 8 taken in the direction of the arrow A in Figure 8 modified to show a cover plate on the panel guiding fixture.
Figure 11:
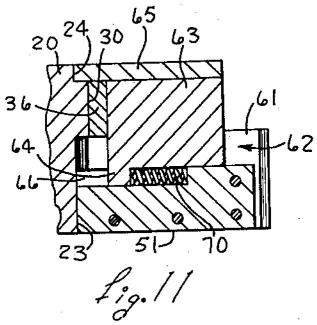
Figure 11 is a section taken on the line XI—XI of Figure 8 modified to show a cover plate on the panel guiding fixture.
Figure 12:
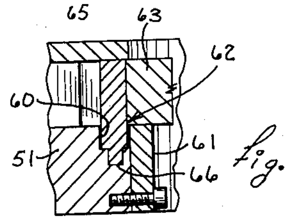
Figure 12 is a section taken on the line XII—XII of Figure 8.
Figure 15:
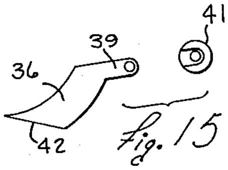
Figure 15 is a view of the rotation-limiting cam generally similar to its appearance in Figure 3 but separated from the surrounding parts for better clarity of illustration.
Figure 14:
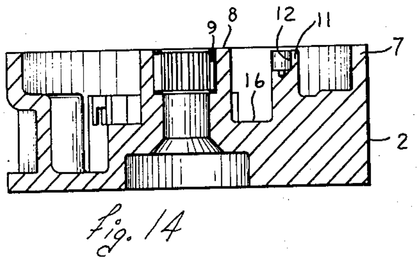
Figure 14 is a section taken on the line XIV—XIV of Figure 6.
Figure 13:
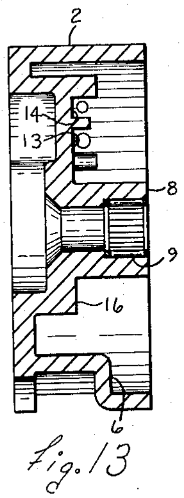
Figure 13 is a section taken on the line XIII—XIII of Figure 6.

The fixture 51 has a notch 60 at its rightward edge which cooperates with a plate 61 affixed, as by screws, to the end of the fixture 51 to define a channel 62 for the reception of a slider 63 which here functions as a limiting device, or limiter, limiting rotation of the fixture 51 and the pawl 56 carried thereby with respect to the base structure 2 as further described hereinafter. Said slider has a downwardly extending lug 64 at its lower edge which fits into a groove 66 in the lower portion of the channel 62 in order to limit the radially outward movement of the slider 63 with respect to said fixture. A light spring 70 is located within the channel 66 and constantly urges the slider 63 toward the ring 20. If desired, a cover plate 65 (Figures 9, 10 and 11) may be secured to the fixture 51 overlying said fixture including the exposed portion 54a of the slot 51 and the channel 62 to prevent entry of dirt thereinto. The cover plate 65 abuts against flat 24 on the ring 20.

A depending annulus 75 of somewhat less diameter than the diameter of the table 1 is arranged on the underside of the table and concentrically therewith.

Referring now to Figure 3 it has already been mentioned that the pin 59 extends downwardly into the opening 29. The slider 63 bears at its radially inward end against the cam surface 42 and is adapted to be moved by said cam surface so that its outward end abuts against the hereinafter-mentioned adjusting screws.

Turning now to the table 1, it will be seen that it has a central downwardly extending post 71 having a first shoulder 72 thereon and a second shoulder 73. When said table is placed in operative position with respect to the base 2 (Figure 16), the shoulder 72 rests on the upper surface 8 of the central hollow boss and the second shoulder 73 rests on the shoulder 9 of said central hollow boss. A screw 74 and washer 76 are provided at the lower end of said central post 71 to bear against the underside 77 of said central boss 8 and thereby hold said table firmly in position.

Depending teeth 78 are arranged on the underside of the annulus 75. Each of said teeth is preferably tapered slightly as at 79 (Figure 4) to facilitate the entry of the pawl 78 between said teeth, particularly accommodating the slanted edge 58a of said pawl, as best appearing in Figure 3.

A plurality of screws 81 having lock nuts 82 thereon extend through the annulus 75, are arranged parallel with the radial extent of said table 1 and are preferably equally spaced circumferentially around said annulus. As best shown in Figure 3 where the broken-line representation of the annulus 75 and parts associated therewith is shown in its operative position with respect to the pawl 56, slide 63 and parts associated therewith, said screws 81 are positioned circumferentially with respect to the teeth 78 so that one of said screws 81 is aligned radially of the table (axially of the screw) with said slider 63 when the pawl 56 is fitted between a pair of teeth 78, in Figure 3 said teeth being designated as 78a and 78b.

*Operation*

The operation of the device of the present invention follows in general the procedure of our above-mentioned application in spite of its rather considerably different structure. However, said operation will be reviewed here in the interest of insuring a complete understanding of the invention.

Starting with the apparatus as shown in Figure 3 which represents the end of an indexing stroke, the cylinder 3 will be activated in any convenient manner (by means not shown) for moving the rod 18 and the rack 17 in a rightward direction. This effects clockwise rotation of the segmental gear 26 on and with respect to the annular platform 16 and the annular boss 8. Said rack will move rightwardly until the stop 19 strikes the block 21 to determine the number of teeth 78 which the pawl 56 will pass in a given cycle of operation. Clockwise movement of the segmental gear 26 will engage one side of the slot 29, the lower side as appearing in Figures 3 and 7, against the pin 59. This will draw said pin radially inwardly and cause a clockwise rotation of the pawl 56 about its pivot pin 57 (Figure 8). This will withdraw the tooth 58 of the pawl from its location between the teeth, in Figure 3 the teeth 78a and 78b, to enable it to move radially inside of said teeth and thereby enable it to move circumferentially with respect to said teeth. The slanted surface 58a of said pawl and the correspondingly slanted surface of the teeth assist in effecting this movement. Such clockwise movement of the pawl 56 circumferentially around the center of the boss 8 will similarly move the fixture 51 and with it the ring 20. The light spring 70 located within the channel 66 (Figure 11) will constantly urge the slider 63 radially inwardly and thereby prevent it from catching against the screws 81 during such circumferential movement.

Upon termination of said clockwise movement by the segmental gear 26 and the parts associated therewith, the energization of the cylinder 3 is reversed, again by any conventional means not here shown, and the rod 18 and rack 17 are caused to move leftwardly. This effects a counterclockwise rotational movement of said segmental gear 26 which acts through the side 29a of the opening 29 against the pin 59 to urge the said pin radially outwardly and thereby move the pawl 58 outwardly into the space between appropriate ones of the teeth 78. Again, the relief of the edge 58a of said pawl and the corresponding relief on said teeth 78 facilitate the entrance of said pawl snugly between a given pair of teeth. Continued counterclockwise movement of the segmental gear 26 then acts through the pin 59 to effect counterclockwise movement about the center C of the base 2 and thereby effects similar counterclockwise movement of the fixture 51. Such movement continues freely until the slider 63 engages the surface 42 of the cam 36. As said counterclockwise movement of the fixture 51 continues, said slider 63 slides radially outwardly, as well as circumferentially counterclockwise, along the surface 42 of said cam 43 until the radially outward end of said slider strikes that one of the screws 81 which is located radially outwardly of same. Upon the slider so striking such a one of the screws 81, its radially outward movement is terminated and, by virtue of the shape of the surface 42 of said cam 36, its circumferential movement is likewise simultaneously terminated. Thus, the amount of rotational movement imparted by the pawl 56 through the teeth 78 to the table 1 is determined by the distance which the slider 63 can move radially outwardly as it slides along the surface 42 of the cam 36 and this in turn is determined by the radial position of a given and determinable one of said screws 81. By moving said screws radially inwardly, said circumferential distance is made relatively short and by moving said screws radially outwardly, said circumferential distance is made relatively long. Thus, by appropriate radial positioning of the several screws 81, the rotational movement of the table in response to appropriate energization of the cylinder 3 can be caused to be stopped at any desired position, the circumferential distances controlled by each of the respective screws 81 overlapping each other, if desired, sufficiently that any desired stopping point may be obtained by appropriate positioning of the proper screws.

Thus, said table can be caused to index to any point desired around its periphery and such point can be determined quickly and easily as desired by the proper positioning of selected ones of the screws 81. Further, the adjustments normal to securing such desired position will compensate for any wear which may occur between the radially inward ends of the screws 81 and the radially outward ends of the slider 63. Still further, it is readily possible to change from one indexing pattern to another quickly and easily merely by changing the settings of appropriate ones of the screws 81 and no further changes or adjustments, particularly no interchanging of cams, is required.

Upon the termination of an indexing movement as above described, the apparatus has returned to the position in Figure 3 and is ready for the commencement of another cycle at the desired moment.

Although a particular embodiment of the invention has been described hereinabove for illustrative purposes, it will be understood that variations or modifications thereof, which lie within the scope of the invention, are fully contemplated unless specifically stated to the contrary in the appended claims.

What is claimed is:

1. A work-holding device arranged for moving a workpiece stepwise in a predetermined pattern, comprising in combination: a work support; a plurality of teeth arranged in a row along said work support; a carrier arranged to move along said row of teeth and carrying a pawl and a limiter, said pawl being engageable and disengageable with said teeth and said limiter being movable in a direction substantially perpendicular to said row of teeth, a cam arranged adjacent the end of said limiter remote from said row of teeth and a plurality of movement-selecting devices arranged in a row generally similar to said row of teeth, said last-named devices being independently adjustable in a direction substantially parallel to the direction of movement of said limiter; means for moving said pawl into engagement with said teeth and simultaneously urging said pawl in the direction of said desired stepwise movement, said cam limiter and control means all being so arranged and spaced with respect to each other that as said teeth and limiter are caused by said pawl to move in the direction of the desired stepwise movement, said limiter will engage said cam and will be urged thereby toward said selecting devices; whereby the distance that said pawl and teeth can move in the direction of said stepwise movement will be determined and limited by the distance that said limiter can move in response to said cam in a direction toward said selecting devices.

2. An indexing table comprising in combination: frame structure; a table rotatably mounted on said frame structure, said table having a row of circularly arranged teeth extending axially therefrom; a plurality of radially arranged and radially adjustable selecting devices affixed to and circumferentially spaced around said table; a cam spaced radially inwardly from said teeth and having a cam surface arranged at an angle with respect to the periphery of said table; a pawl and means supporting said pawl for radial movement into and out of engagement with said teeth and means for driving said pawl circumferentially with respect to said frame; a limiter radially movable with respect to said frame and movable circumferentially with respect thereto simultaneously with said pawl, said limiter being engageable by said cam and movable radially outwardly thereby to a distance limited by a selected one of said selecting devices; whereby the circumferential movement of said pawl and consequently of said teeth and table is determined by the radial distance said limiter can move along said cam in response to said circumferential movement imparted thereto by said pawl.

3. An indexing table comprising in combination: a frame structure having an upstanding hollow central boss; a table rotatably supported, on and by said central boss and having a plurality of teeth arranged in a row concentrically around said central boss and extending axially from said table; a plurality of radially arranged circumferentially spaced screws and means for mounting same on said table for radial adjustment with respect to said table; a cam adjacent said central boss and having a cam surface positioned at an angle with the periphery of said table; a fixture positioned between said teeth and said boss and movable circumferentially with respect to said frame around said boss, said fixture carrying a radially movable pawl and also carrying a radially movable limiting device; means effecting simultaneous radial outward movement of said pawl for engagement and disengagement thereof with said teeth, circumferential movement of said fixture causing said limiting device to engage the surface of said cam and move in response thereto radially outwardly until such movement is limited by engagement of said limiting device with one of said selecting devices; whereby radially outward movement of said limiting device will terminate and will thereby simultaneously terminate its circumferential movement and the circumferential movement of said pawl and the teeth and table associated therewith.

4. The device defined in claim 3 wherein the axially mid-portion of said screws is located at approximately the same radius as the radially central portion of said teeth.

5. The device defined in claim 3 including an axially extending annulus having said teeth formed on the exposed edge thereof and wherein said screws extend radially through said annulus.

6. The device defined in claim 3 including a segmental gear arranged around said central boss for rotation around same and a pair of cams associated with said segmental gear, each cooperable with said pawl for moving said pawl radially inwardly and in one circumferential direction upon rotation of said segmental gear in one rotational direction and for moving said pawl radially outwardly and in the other circumferential direction upon movement of said segmental gear in the opposite rotational direction; and power-responsive means for effecting rotational movement of said segmental gear in a desired direction.

7. The device defined in claim 6 wherein said teeth extend downwardly toward said frame structure and said cam is arranged closely against said hollow boss and faces radially outwardly toward said teeth and in substantial alignment therewith; whereby said fixture, pawl, slider and other parts associated therewith are located below said table and radially between said teeth and said hollow boss.

References Cited in the file of this patent

UNITED STATES PATENTS

| | | |
|---|---|---|
| 2,807,175 | Tandler et al. | Sept. 24, 1957 |
| 2,848,909 | Hill | Aug. 26, 1958 |